United States Patent
Zhang

(10) Patent No.: US 10,432,507 B2
(45) Date of Patent: *Oct. 1, 2019

(54) CUSTOMIZED COMMUNICATIONS FOR NETWORK SYSTEMS

(71) Applicant: Uber Technologies, Inc., San Francisco, CA (US)

(72) Inventor: Guangqiang Zhang, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,658

(22) Filed: Oct. 8, 2018

(65) Prior Publication Data

US 2019/0044851 A1 Feb. 7, 2019

Related U.S. Application Data

(63) Continuation of application No. 15/621,959, filed on Jun. 13, 2017, now Pat. No. 10,142,222.

(51) Int. Cl.
*H04L 12/725* (2013.01)
*H04L 29/08* (2006.01)
(Continued)

(52) U.S. Cl.
CPC ............ *H04L 45/308* (2013.01); *G06F 16/00* (2019.01); *H04L 67/306* (2013.01); *G06Q 30/02* (2013.01); *H04L 67/1097* (2013.01); *H04L 67/18* (2013.01)

(58) Field of Classification Search
CPC .... G08G 1/0112; G08G 1/0129; G06F 16/00; G06Q 30/02; H04L 41/00; H04L 45/308; H04L 67/1097; H04L 67/18; H04L 67/306
(Continued)

(56) References Cited

U.S. PATENT DOCUMENTS 6,738,809 B1 * 5/2004 Brisebois ................ H04L 41/22
345/172
7,558,578 B1 7/2009 De Beer
(Continued)

OTHER PUBLICATIONS

PCT International Search Report and Written Opinion, PCT Application No. PCT/162018/054058, dated Sep. 20, 2018, 12 pages.
(Continued)

*Primary Examiner* — Tan H Trinh

(74) *Attorney, Agent, or Firm* — Fenwick & West LLP

(57) ABSTRACT

A network system customizes communications and communication channels for delivery to candidate providers registering with the network system. Candidate providers progress through steps of a network registration process by providing input data at the various steps. The network system provides communications to request the input data and facilitate the candidate providers' progress. The network system can use a machine learning model to predict particular types of communications and communication channels (e.g., online messages, phone calls, physical mail, etc.) that are likely to be well-received by candidate providers. Thus, the network system is able to increase the expected number of candidate providers that successfully register to provide services to other users of the network system.

20 Claims, 6 Drawing Sheets

(51) Int. Cl.
*G06F 17/30* (2006.01)
*G06Q 30/02* (2012.01)
*G06F 16/00* (2019.01)

(58) Field of Classification Search
USPC ............ 455/414.1, 9, 456.2, 518, 519, 297,
455/452.2; 370/310, 342; 707/710;
709/206, 205; 725/32, 26.7, 14.58
See application file for complete search history.

(56) References Cited

U.S. PATENT DOCUMENTS

| | | | |
|---|---|---|---|
| 7,707,059 B2 | 4/2010 | Reed et al. | |
| 8,184,547 B2* | 5/2012 | Sumner | H04L 41/00 370/252 |
| 9,055,055 B1* | 6/2015 | Strand | H04L 63/0815 |
| 9,275,118 B2 | 3/2016 | Brezina et al. | |
| 9,348,493 B2* | 5/2016 | Zhang | G06F 3/04842 |
| 9,805,130 B1 | 10/2017 | Reddy et al. | |
| 9,948,780 B1* | 4/2018 | Dinardo | H04M 3/5191 |
| 9,986,089 B2* | 5/2018 | Gilbert | H04M 3/5141 |
| 10,142,222 B1* | 11/2018 | Zhang | H04L 45/308 |
| 2007/0116231 A1* | 5/2007 | DeGraaff | H04M 3/523 379/212.01 |
| 2007/0127650 A1 | 6/2007 | Altberg et al. | |
| 2007/0162550 A1 | 7/2007 | Rosenberg | |
| 2007/0192414 A1* | 8/2007 | Chen | H04L 29/04 709/205 |
| 2008/0065726 A1* | 3/2008 | Schoenberg | G06Q 10/06375 709/205 |
| 2008/0069071 A1 | 3/2008 | Tang | |
| 2008/0201733 A1* | 8/2008 | Ertugrul | G06F 17/30867 725/32 |
| 2008/0320521 A1* | 12/2008 | Beadle | G06Q 30/02 725/46 |
| 2009/0144237 A1 | 6/2009 | Branam et al. | |
| 2011/0054952 A1* | 3/2011 | Mateer | G06Q 10/00 705/5 |
| 2011/0208822 A1* | 8/2011 | Rathod | G06F 16/9535 709/206 |
| 2011/0225293 A1* | 9/2011 | Rathod | G06Q 10/00 709/224 |
| 2011/0258266 A1 | 10/2011 | Serra et al. | |
| 2011/0306353 A1 | 12/2011 | Kim et al. | |
| 2012/0227035 A1* | 9/2012 | Obasanjo | H04L 67/303 717/176 |
| 2012/0303435 A1* | 11/2012 | Rawat | G06Q 30/0226 705/14.27 |
| 2012/0317027 A1 | 12/2012 | Luk et al. | |
| 2012/0323690 A1* | 12/2012 | Michael | G06Q 30/02 705/14.58 |
| 2013/0044657 A1 | 2/2013 | Oh et al. | |
| 2014/0164529 A1* | 6/2014 | Kleppmann | H04L 51/066 709/206 |
| 2015/0012445 A1* | 1/2015 | Reid | G06Q 10/20 705/305 |
| 2015/0088784 A1 | 3/2015 | Dhara et al. | |
| 2015/0127628 A1* | 5/2015 | Rathod | H04W 4/21 707/710 |
| 2015/0161625 A1 | 6/2015 | Heath et al. | |
| 2015/0188858 A1 | 7/2015 | Nagata et al. | |
| 2015/0294361 A1 | 10/2015 | Yedidim | |
| 2015/0310532 A1 | 10/2015 | Gura et al. | |
| 2015/0382263 A1* | 12/2015 | Jain | H04W 76/10 455/432.1 |
| 2016/0063471 A1 | 3/2016 | Kobres et al. | |
| 2016/0072466 A1 | 3/2016 | Kuromusha et al. | |
| 2016/0344798 A1* | 11/2016 | Kapila | H04L 67/34 |
| 2017/0061409 A1* | 3/2017 | Morecki | G06Q 50/01 |
| 2017/0110009 A1* | 4/2017 | Knoepfle | G08G 1/0129 |
| 2017/0116546 A1 | 4/2017 | Alonzo-Reynaud | |
| 2017/0161451 A1 | 6/2017 | Weinstein et al. | |
| 2017/0171047 A1* | 6/2017 | Freishtat | H04L 43/08 |
| 2017/0236131 A1* | 8/2017 | Nathenson | G06Q 30/0201 705/26.7 |
| 2017/0257333 A1 | 9/2017 | Kaplinger et al. | |
| 2017/0316022 A1 | 11/2017 | Joshi et al. | |
| 2017/0316484 A1 | 11/2017 | Holmes et al. | |
| 2018/0032997 A1 | 2/2018 | Gordon et al. | |
| 2018/0053114 A1* | 2/2018 | Adjaoute | G06N 99/005 |
| 2018/0082213 A1* | 3/2018 | McCord | G06N 7/005 |
| 2018/0300660 A1* | 10/2018 | Coan | G06Q 10/06311 |
| 2018/0314998 A1* | 11/2018 | Liu | G06Q 10/06313 |
| 2018/0324828 A1* | 11/2018 | Mukherjee | H04L 5/0042 |
| 2018/0332115 A1* | 11/2018 | Mase | H04L 67/42 |
| 2018/0343482 A1* | 11/2018 | Loheide | H04N 21/2393 |

OTHER PUBLICATIONS

United States Office Action, U.S. Appl. No. 15/621,959, dated Mar. 2, 2018, 16 pages.

* cited by examiner

300

| | Received | In Review | Rejected | Follow Up | Approved |
|---|---|---|---|---|---|
| Background Check | Yes | | | | Yes |
| Driver License | Yes | | | | Yes |
| Vehicle Insurance | Yes | Yes | | | |
| Vehicle Registration | No | | | | |
| Vehicle Inspection | No | | | | |
| Other Documents | No | | | | |

CUSTOMIZED COMMUNICATIONS FOR NETWORK SYSTEMS

CROSS REFERENCE TO RELATED APPLICATION

This application is a continuation of co-pending U.S. patent application Ser. No. 15/621,959, filed Jun. 13, 2017, which is incorporated by reference herein in its entirety for all purposes.

BACKGROUND

This disclosure generally relates to communications and channels, and specifically to customizing communications for registration on a network system.

In a network system, providers provide geographic location-based services to users, for example, a provider uses a vehicle to transport a user or an item. The system communicates information to users and providers regarding services of the system. In one use case, the system delivers communications to candidate providers to request input data for a network registration process. The system uses the input data to determine whether a candidate provider satisfies certain criteria to register with the system. However, candidate providers may not provide the input data if the communications are unclear or delivered via an ineffective communication channel. Systems can use third parties to help provide communications, but candidate providers may often perceive these communications as disjointed and not personalized. If the system does not receive sufficient input data from candidate providers through the network registration process, the system will not be able to sustain or grow a population of registered providers. For example, the network registration process may include a funnel of steps, where certain steps need to be completed by the candidate providers before progressing to subsequent steps. It is challenging and desirable for the system to deliver communications that efficiently funnel candidate providers through the network registration process.

SUMMARY

A network system customizes communications and communication channels for candidate providers registering with the network system. During the registration process, candidate providers progress through steps by providing input data. For example, candidate providers provide vehicle and driver's license information to register to provide transportation services to other users of the network system. The network system messages the candidate providers to request the input data and facilitate the candidate providers' progress. Since candidate providers have different communication preferences, they may not be receptive to generic messages and reminders, which prevents the candidate providers from completing the registration processes. To solve this problem, the network system can use a machine learning model to predict particular types of communications and communication channels (e.g., online messages, phone calls, physical mail, etc.) that are likely to be well-received by certain candidate providers. Thus, the network system is able to increase the expected number of candidate providers that successfully register to provide services to other users.

BRIEF DESCRIPTION OF DRAWINGS

Figure (FIG. 1 is a diagram of a system environment for a network system according to one embodiment.

FIG. 3 is a diagram of steps for a network registration process according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A network system coordinates providers who provide geographic location-based services to users. The location-based services may include transportation of users or goods using a vehicle. As used herein, "candidate providers" are users or providers who want to register with the network system to provide services and who progress through steps of a network registration process. The network system determines whether the candidate providers are eligible to provide services on the network system according to certain criteria. For example, in one embodiment a candidate provider is required to have an inspected vehicle as well as valid vehicle registration and insurance to provide transportation services. The network system customizes communications and communication channels (e.g., online messages, phone calls, physical mail, etc.) to deliver the communications to candidate providers. Communications may request input data from the candidate providers that the network system uses to determine whether candidate providers satisfy the criteria to register with the network system. By customizing communications, the network system is more likely to funnel candidate providers through network registration processes, and thus engage more providers to provide services to users of the network system. Further, by analyzing historical actions of candidate providers in responding to communications, the network system can build a personalized and unified model to predict the communication preferences of candidate providers.

I. System Overview

Figure 1:
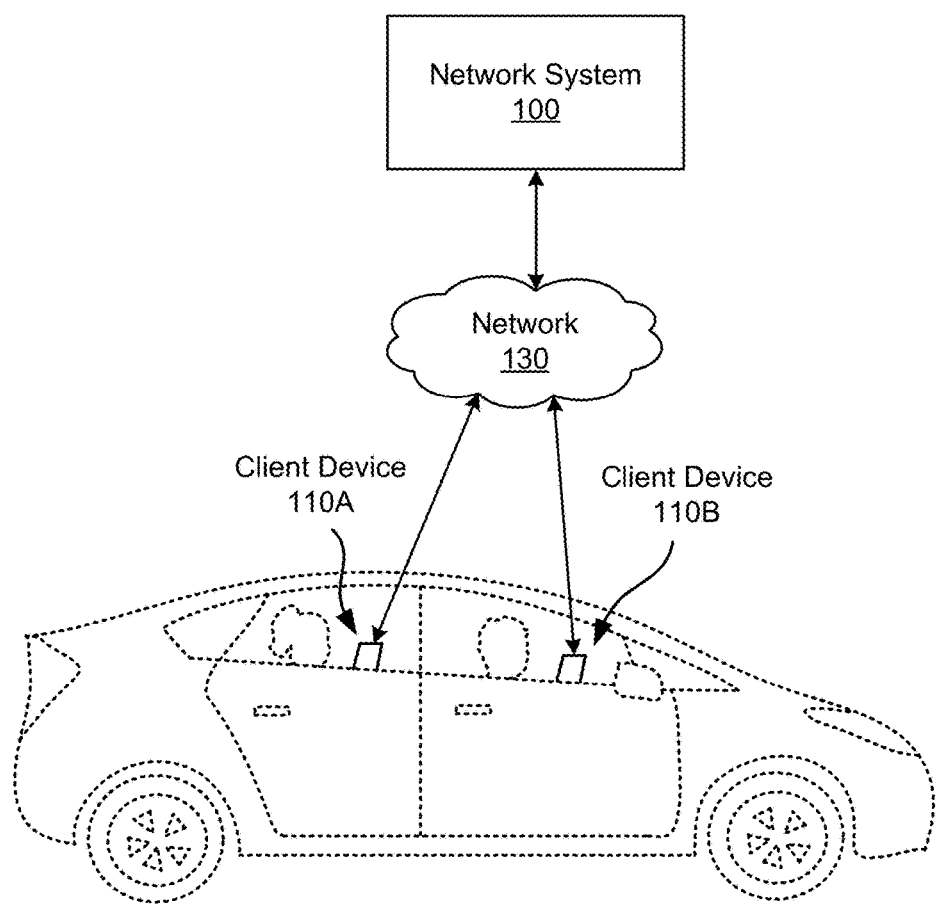

FIG. 1 is a diagram of a system environment for a network system 100 according to one embodiment. Users of the network system 100 may include providers that provide service to other users. In an example use case, a provider operates a vehicle to transport a user from a first location (e.g., an origin or pickup location) to a second location (e.g., a drop-off location). Other types of service include, for example, delivery of goods (e.g., mail, packages, or consumable items) or services. Candidate providers who want to become eligible to provide services to users with the network system 100 complete one or more network registration processes. If the network system 100 determines that a candidate provider meets certain criteria, the network system 100 registers the candidate provider as a provider.

The network system 100 may provide different network registration processes based on the type of service for which a candidate provider is applying.

The system environment includes the network system 100 and one or more client devices 110 of users of the network system 100, for example, client device 110A of a user and client device 110B of a provider providing service to the user, which may be collectively or individually referred to herein as a "client device 110" or "client devices 110." The various systems shown in FIG. 1 are connected to each other via a network 130. In other embodiments, different and/or additional entities can be included in the system architecture. The functions performed by the various entities of FIG. 1 may vary in different embodiments.

A user can interact with the network system 100 through the client device 110, e.g., to request transportation or to receive requests to provide transportation to other users. Further, candidate providers can use the client device 110 to complete a network registration process. A user may also become a candidate provider by starting a network registration process. Additionally, providers may also be users of the network system 100, e.g., people who both provide and receive services on the network system 100. As described herein, a client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device 110 can present information received from the network system 100 on a user interface, such as communications for a network registration process, or a map of the geographic region and the current location of the client device 110. The client application running on the client device 110 can determine the current location and provide the current location to the network system 100.

In one embodiment, the networking system 100 coordinates trips between users and providers. In this example, through operation of the client device 110, a user makes a trip request to the network system 100 requesting a provider. For example, the trip request may include user identification information, the number of passengers for the trip, a requested type of provider (e.g., a vehicle type or service option identifier), the current location and/or the origin location (e.g., a user-specific geographical location for pickup, or a current geographical location of the client device 110), and/or the destination for the trip. The current location (or origin location) of the client device 110 may be designated by the user (e.g., based on an input string of text or audio/voice signal), or detected using a sensor of the client device 110 such as a GPS sensor. The network system 100 can generate a trip record for the trip request, and associate information about the corresponding trip with the trip record.

In some embodiments, a provider uses a client device 110 to interact with the network system 100 and receive invitations to provide services for users. For example, the provider is a person operating a vehicle capable of transporting users. In some embodiments, the provider is an autonomous vehicle that receives routing instructions from the network system 100. For convenience, this disclosure generally uses a car as the vehicle, which is operated by a driver as an example provider. However, the embodiments described herein may be adapted for a provider operating alternative vehicles (e.g., boat, airplane, helicopter, etc.) or vehicles that do not necessarily need to be operated by a person.

Client devices 110 can communicate with the network system 100 via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or WiFi. In some embodiments, all or some of the communication links of the network 130 may be encrypted.

II. Example System Architecture

Figure 2:
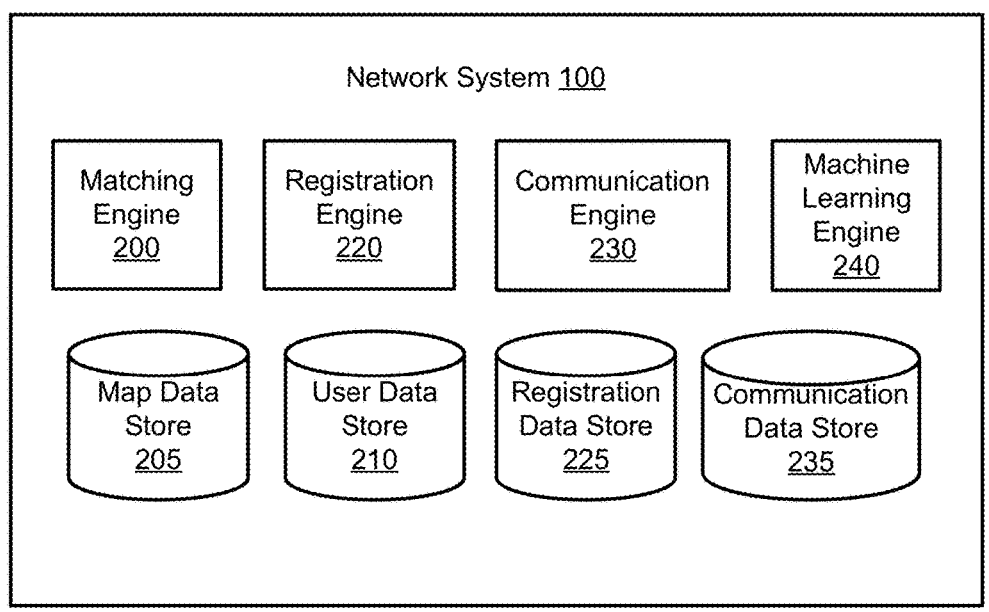
FIG. 2 is a block diagram illustrating the architecture of the network system according to one embodiment.

FIG. 2 is a block diagram illustrating the architecture of the network system 100 according to one embodiment. The network system 100 includes a matching engine 200, map data store 205, user data store 210, registration engine 220, registration data store 225, communication engine 230, communication data store 235, and machine learning engine 240. In other embodiments, the network system 100 may include additional, fewer, or different components for various applications. Conventional components such as network interfaces, security functions, load balancers, failover servers, management and network operations consoles, and the like are not shown so as to not obscure the details of the system architecture.

In some embodiments, candidate providers or users use their client devices 110 to register with the network system 100, for example, by creating accounts and providing user information (e.g., contact information, a home or office address, billing information, vehicle or license information, etc.) to the network system 100. The network system 100 may provide different network registration processes for candidate providers and users because the network system 100 may request different input data (e.g., user information) between providers and users. The network system 100 can store the user information as well as information associated with trip records of the users or providers in the user data store 210. For instance, information for trip records describes trips that a user received from providers, trips that a provider provided to users, or other types of trips such as delivery services provided by providers. The network system 100 can associate feedback received from a user or data from trip records with registered accounts of users or providers.

The matching engine 200 selects providers to service the requests of users. For example, the matching engine 200 receives a trip request from a user and determines a set of available providers that are online, open (e.g., are available to transport a user), and near the requested origin (e.g., pickup) location for the user (e.g., based on map information from a data source). The matching engine 200 selects a provider from the set of available providers to which it transmits an assignment request. Additionally, the matching engine 200 may select a provider based on the particular services for which the provider is registered, the provider's location, the origin and/or destination location, the type of the provider, among other factors. Thus, the matching engine 200 can select a given provider for one type of service, but the given provider may not be eligible to be selected for another type of service (e.g., if the provider has not registered to provide the other type of service).

The map data store 205 stores map information of geographic regions in which the network system 100 offers services such as transportation for users. The maps contain information about roads within the geographic regions. For the purposes of this disclosure, roads can include any route between two places that allows travel by foot, motor vehicle, bicycle, or other suitable forms of travel. Examples of roads include streets, highways, freeways, trails, bridges, tunnels, toll roads, or crossings. Roads may be restricted to certain users, or may be available for public use. The map data store 205 may also store information specific to a geographic region such as languages spoken by the population of the geographic region or cultural information of the local population.

The registration engine 220 provides network registration processes to candidate providers (or users) of the network system 100. A network registration process includes one or more steps that a candidate provider is required to complete, which enables the registration engine 220 to receive input data required to determine if the candidate provider satisfies the criteria for the network registration process. The input data may include text, different types of media (e.g., images, audio, or video), various types of documents (e.g., background check report, vehicle registration, or vehicle inspection report), among other types of information. The registration engine 220 may provide the steps in sequence, in parallel, or in some combination thereof. For a sequence of steps, the candidate provider needs to complete a given step before the registration engine 220 provides a subsequent step in the sequence.

The registration engine 220 provides communications via the communication engine 230 to inform candidate providers regarding the input data required for network registration processes. The communications and communication channels through which the communications are delivered may be customized, which is further described below with reference to the communication engine 230. The communications may prompt the candidate provider to perform actions (e.g., to provide certain input data). For instance, to provide a vehicle inspection report, a candidate provider may be prompted through communications to schedule an inspection for the candidate provider's vehicle. For a particular step, the registration engine 220 may determine that there are many actions (or combination of actions) that the candidate provider can complete to satisfy requirements of that step or obtain the requested input data. The communications may also include reminders to candidate providers who have not yet provided requested input data or completed a required action. In addition to requesting input data from candidate providers, the registration engine 220 may also receive input data from the user data store 210 that the candidate provider previously provided to the network system 100.

The registration engine 220 tracks and stores progress (e.g., indicating which steps have been completed or not) of network registration processes for candidate providers in the registration data store 225. Particularly, the registration engine 220 may store historical input data, which may also include actions performed by the candidate provider as well as other candidate providers or users of the network system 100. The registration engine 220 also stores input data received for network registration processes, which may be associated with a particular step or action, in the registration data store 225. The registration engine 220 may provide candidate providers the option to opt-out of tracking their progress and actions in regard to network registration processes. In some embodiments, candidate providers may opt-in to certain aspects of the tracking. For example, the registration engine 220 only monitors particular actions of a candidate provider if the network system 100 has received permission from the candidate provider to track those particular actions.

The communication engine 230 determines customized communications (also referred to herein as "messages") and provides communications via various communication channels to candidate providers. Communication channels include, for example, text message, email, link to a website or webpage, online chat, phone call from live caller or an automated system, voicemail, physical mail, in-app message (e.g., provided within an application of the network system 100), chatbot, among other suitable types of communication channels. The communication engine 230 tracks actions of candidate providers performed with—or in response to—communications and stores the actions (e.g., along with historical communications previously provided to candidate providers) in the registration data store 225 or the communication data store 235. The action may indicate whether a candidate provider viewed or received a delivered communication, for instance, scrolling through content of a message, opening an email, or responding to a phone call. The communication engine 230 may retrieve communications from a database of communications stored in the communication data store 235.

Further, the communication engine 230 may also determine and store metadata describing the actions. In some embodiments, tracking by the communication engine 230 may be an opt-in feature or have opt-out options (e.g., similar to tracking by the registration engine 220). The metadata may indicate viewing metrics such as a duration of time that a candidate provider viewed a communication, a timestamp of when a candidate provider viewed a communication, or a rate at which a candidate provider scrolled through a message using a client device 110. In addition, the metadata may indicate actions performed by a candidate provider in response to a communication. The actions can indicate that the candidate provider is receptive to the communication (e.g., replying or archiving a message or scheduling or providing RSVP for an event or appointment), or not receptive (e.g., deleting the message or requesting to stop receiving communications via a given communication channel). The communication engine 230 customizes communications using a machine learning model, which is further described below.

The machine learning engine 240 uses machine learning techniques to train a model to customize communications and communication channels for network registration processes. The machine learning engine 240 trains models based on feature vectors derived from historical actions performed by a population of users (including candidate providers and registered providers) of the network system 100. To generate feature vectors, the machine learning engine 240 may retrieve information from other components of the network system 100 such as the registration data store 225 and communication data store 235. The machine learning engine 240 may implement machine learning techniques such as deep learning, logistic regression, convolutional neural networks, or other types of dimensionality reduction processes.

In some use cases for training models, the feature vectors are labeled based on characteristics of the historical actions. The labels may indicate whether the feature vectors include communications that candidate providers positively received (e.g., viewed and responded to by candidate providers) or negatively received (e.g., ignored or not responded to by candidate providers) based on the historical actions. Thus, a machine learning model may be trained to learn which types of communications are more likely to be positively (or negatively or neutrally) received by other candidate providers. Additionally, the labels may indicate which communication channels were used to deliver the communications included in the feature vectors. As a result, the machine learning model can learn the types of communication channels to which a candidate provider is more likely to be receptive. The model may learn that the preferred communications or communication channels depend on certain conditions, such as to which step a candidate provider has progressed in a network registration process, a type of service associated with the network registration process in progress, or what action or input data is requested by the communication. By predicting types of communications and communication channels that are likely to be well received (or not), the machine learning model can develop a profile of preferences customized to a particular candidate provider.

When a candidate provider initially joins the network system 100, the network system 100 may not have much information about the candidate provider. Thus, a model to predict the preferences of the candidate provider is trained using historical actions or user information describing other candidate providers. The machine learning engine 240 may use information from other candidate providers who have characteristics in common with the candidate provider (e.g., registering for the same type of service, having similar demographics, or being located within a certain geographical region), and may infer that similar candidate providers are expected to have at least some similar preferences as well. If the network system 100 has information for a large population of candidate providers, providers, and users, the machine learning engine 240 can take advantage of this extensive data set to train models that can extract potential patterns in the tracked behavior of candidate providers. As the network system 100 receives more information relating to the candidate provider, the machine learning engine 240 supplements training with feature vectors including describing actions performed by the candidate provider.

The machine learning engine 240 can train machine learning models to customize various aspects of content included in communications. In addition, the machine learning engine 240 may update existing communications stored in the communication data store 235 or generate new communications for storage. The aspects may include an action instructed by a communication, a language of the communication, or a specific format of the content. A given step of a network registration process may be completed by any one of multiple actions. Thus, the model predicts which one of the actions a candidate provider is most likely to complete by determining actions that a sample population of other candidate providers frequently completed (e.g., greater than a threshold number of times or more frequently relative to other possible actions) when instructed by previously delivered communications. For instance, to provide a copy of a valid vehicle registration, a candidate provider can upload a photo of the document to the network system 100 using a client device 110 or mail a physical copy. The model may determine that one subgroup of candidate providers prefers to provide input data using one method, while another subgroup prefers to provide the same input data using a different method. Further, the model can use geographical information from the map data store 205 to determine the candidate provider-preferred language of the communication or nuances in phrasing based on regional cultures.

Further, the machine learning engine 240 can train machine learning models to customize delivery of communications to candidate providers. The models may predict a certain time of day that a candidate provider is more likely to view or respond to a message based on timestamps indicating when the candidate provider—or other candidate providers—typically view or respond to messages. Additionally, the models may determine that candidate providers take a longer time to respond to communications delivered around holidays or vacations of candidate providers. The models may learn that candidate providers are more receptive to a particular communication channel during specific time windows of a given day.

III. Example Network Registration Process

FIG. 3 is a diagram 300 of steps for a network registration process according to one embodiment. In the example illustrated in FIG. 3, the registration engine 220 of the network system 100 provides the network registration process for candidate providers who want to register to provide transportation services using a vehicle. Thus, the registration engine 220 uses vehicle and driver related criteria to determine if a candidate provider is eligible to provide the transportation services. The criteria may indicate that a candidate provider needs to pass a background check, have a valid driver license, have a valid vehicle insurance, have a valid vehicle registration, passed an inspection of the candidate provider's vehicle (i.e., a vehicle to be used to provide services), provide any other required documents, or satisfy any other suitable criteria.

The diagram 300 illustrates a candidate provider's progress through a network registration process for providing transportation services, in one embodiment. As shown in FIG. 3, the registration engine 220 has received the background check, driver license, and vehicle registration for the candidate provider. The network system 100 has approved the background check and driver license, e.g., by validating corresponding documents provided by the candidate provider. Additionally, the network system 100 is currently reviewing the candidate provider's vehicle insurance. The registration engine 220 has not yet received the vehicle registration and vehicle inspection of the candidate provider. In one embodiment where the network registration process includes a sequence of steps, the registration engine 220 does not request the vehicle registration until the network system 100 approves the vehicle insurance. In other words, the registration engine 220 does not progress the candidate provider to the subsequent "vehicle registration" step until the registration engine 220 determines that the candidate provider has completed the "vehicle insurance" step. In other embodiments, the registration engine 220 may progress the candidate provider to a subsequent step while the network system 100 is still reviewing information from a prior step.

The diagram 300 shown in FIG. 3 is for illustrative purposes only, that is, the network system 100 does not necessarily track progress of candidate providers using a table similar to the diagram 300. The network system 100 may use any suitable data structure or method to monitor and store steps of network registration processes that candidate providers have completed or not.

Figure 4:
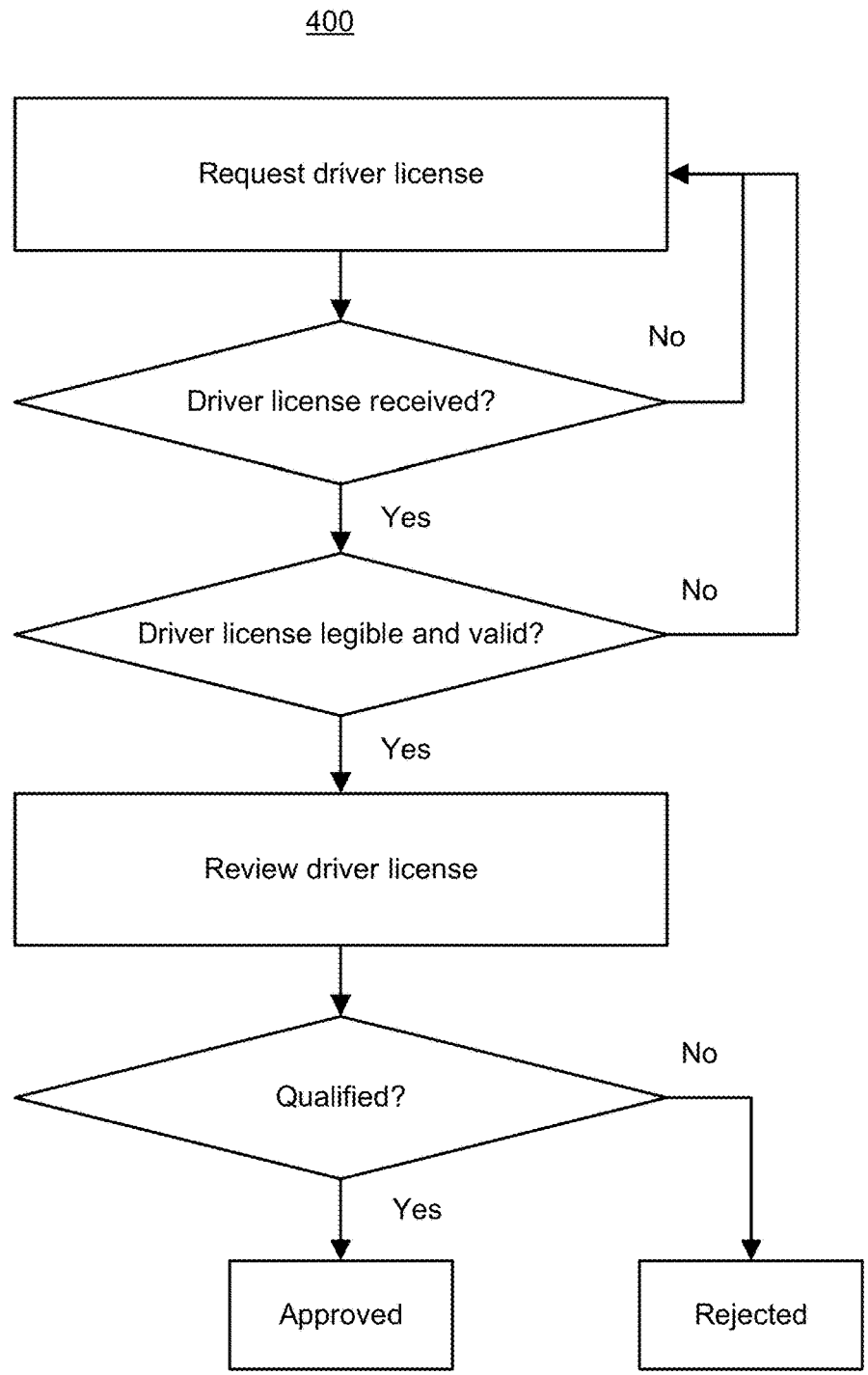
FIG. 4 is a flowchart illustrating a process for progressing a candidate provider through the steps of the network registration process shown in FIG. 3 according to one embodiment.

FIG. 4 is a flowchart illustrating a process 400 for progressing a candidate provider through the steps of the network registration process shown in FIG. 3 according to one embodiment. FIG. 4 shows the process 400 for a "driver license" step, though the registration engine 220 may use the process 400 for any of the other steps of the network registration process. After providing a communication requesting a candidate provider's driver license information, if the registration engine 220 receives the driver license (e.g., a scanned copy or photo), the registration engine 220 determines if the driver license is legible and valid. If the registration engine 220 does not receive the driver license within a threshold duration of time after providing the communication, the communication engine 230 may provide a subsequent communication reminding the candidate provider to provide the driver license. Additionally, the communication engine 230 may use a trained machine learning model to customize the subsequent communication. For example, the model determines that the candidate provider may be more likely to complete the requested action if the communication engine 230 provides the subsequent communication via a different communication channel than the initial communication request. If the registration engine 220 determines that the driver license is not legible or valid, the communication engine 230 can provide another communication informing the candidate provider of the deficiency and requesting that the candidate provider provide another copy of the driver license.

In response to determining that the received driver license is legible and valid, the registration engine 220 provides the driver license for review, which may be completed manually or automatically by the network system 100 using predetermined rules. For example, the predetermined rules indicate that the candidate provider needs to have over one year of driving experience to qualify to register to provide transportation services on the network system 100. In response to determining that the candidate provider qualifies for registration, the registration engine 220 approves the driver license and progresses the candidate provider to the next step in the network registration process. On the other hand, if the candidate provider does not qualify for registration, the registration engine 220 does not progress the candidate provider. Rather, the communication engine 230 may provide another communication explaining why the candidate provider does not qualify to register for the corresponding service. However, the communication may also indicate another service of the network system 100 (e.g., having different requirements) that the candidate provider may be eligible to provide to users.

IV. Example Process Flows

Figure 5:
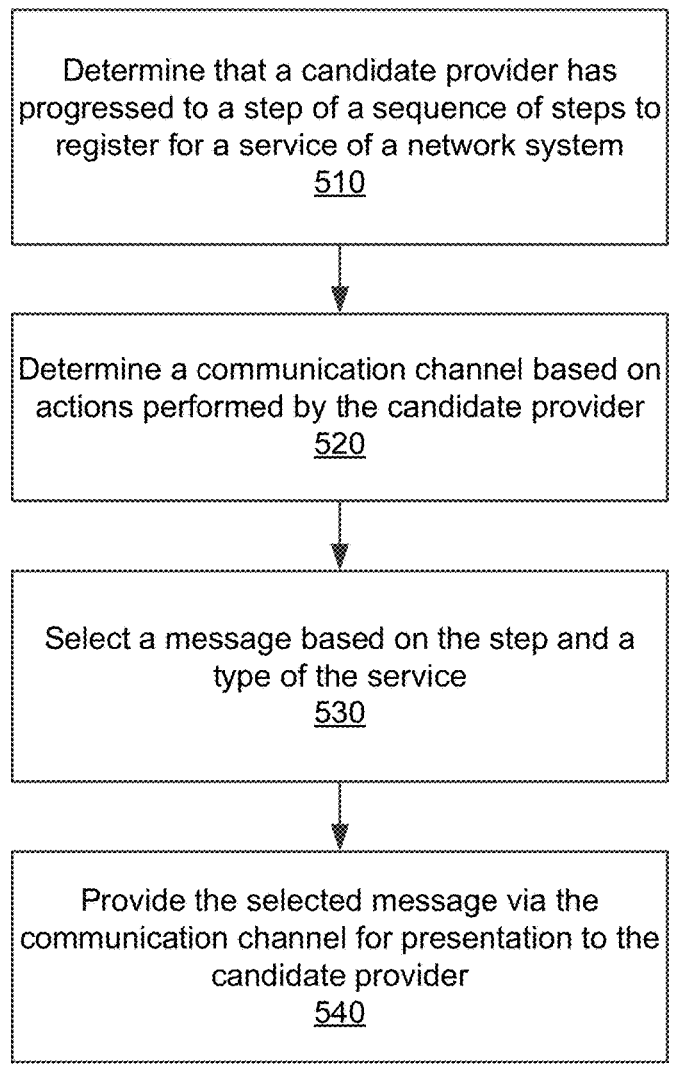
FIG. 5 is a flowchart illustrating a process for customizing communications and communication channels according to one embodiment.

FIG. 5 is a flowchart illustrating a process 500 for customizing communications and communication channels according to one embodiment. In some embodiments, the process 500 is used by the network system 100—e.g., modules of the network system 100 described with reference to FIG. 2—within the system environment in FIG. 1. The process 500 may include different or additional steps than those described in conjunction with FIG. 5 in some embodiments or perform steps in different orders than the order described in conjunction with FIG. 5.

In one embodiment, the registration engine 220 determines that a candidate provider has progressed to a step of a sequence of steps to register for a service of a network system 510, e.g., using a network registration process. The communication engine 230 determines a communication channel of a set of communication channels, for messaging the candidate provider to progress the candidate provider to a subsequent step of the sequence of steps, based at least in part on actions performed by the candidate provider 520 with historical communications presented to the candidate provider via the set of communication channels. The communication engine 230 selects a communication of a set of candidate communications based on the step and a type of the service 530. Each of the candidate communications indicates at least one of a set of actions, where the candidate provider has to complete one or more of the actions to progress to the subsequent step. The communication engine 230 provides the selected message via the communication channel for presentation to the candidate provider 540.

In one embodiment, the registration engine 220 progresses the candidate provider from the step to the subsequent step in response to determining that the candidate provider completed the action indicated by the selected communication, e.g., using the client device to provide requested input data. The communication engine 230 determines a new communication channel based on the completed action, where the new communication channel is not originally included in the set of communication channels. Thus, the communication engine 230 can provide a subsequent message for the subsequent step via the new communication channel. As an example, the network system 100 does not have the candidate provider's email address when the candidate provider starts the network registration process, so the communication engine 230 cannot initially deliver email messages to the candidate provider. However, the registration engine 220 determines that the input data received for the step includes the candidate provider's email address and stores the email address in the user data store 210 or registration data store 225. As a result, the communication engine 230 can email messages to the candidate provider for subsequent steps.

V. Example Physical Components of a Computer

Figure 6:
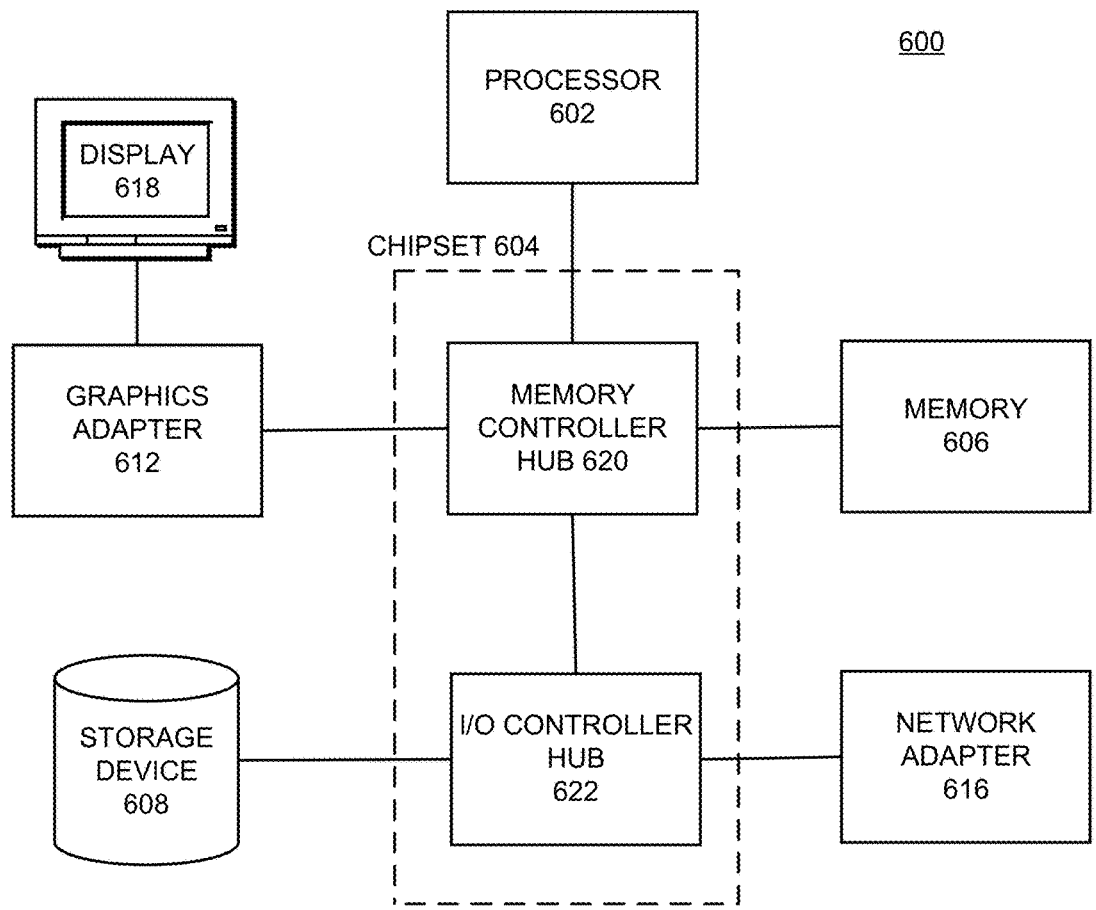
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100 or client devices 110A and 110B), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

VI. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for customizing communication channels of a network system, comprising:
    determining, based on input data from a client device, that a candidate provider has progressed to a step of a sequence of steps to register for a service of the network system;
    selecting a first communication channel that the candidate provider is likely to use to respond to a communication;
    providing, by the network system to the client device, the communication via the first communication channel for presentation to the candidate provider;
    progressing the candidate provider from the step to a subsequent step of the sequence of steps in response to determining that the candidate provider completed at least one action indicated by the communication; and
    providing, by the network system to the client device, a subsequent communication for the subsequent step via a second communication channel for presentation to the candidate provider, the second communication channel different than the first communication channel.

2. The method of claim 1, further comprising:
    determining, by a machine learning model, that the candidate provider is likely to use the first communication channel to respond to the communication, the machine learning model trained using historical actions performed by one or more candidate providers and registered providers of the network system.

3. The method of claim 2, wherein machine learning model determines that the candidate provider is likely to use the first communication channel to respond to the communication based on at least one of: the step of the sequence of steps, a type of the service, or the at least one action indicated by the communication.

4. The method of claim 2, wherein machine learning model determines that the candidate provider is likely to use the first communication channel to respond to the communication using information from the one or more candidate providers and registered providers having at least one characteristic in common with the candidate provider, the at least one characteristic based on demographics or geographical region.

5. The method of claim 1, further comprising:
    determining that the candidate provider is likely to use the first communication channel to respond to the communication using actions performed in response to a plurality of historical communications by the candidate provider.

6. The method of claim 5, wherein the actions include one or more of: scrolling through content of a message, opening an email, or responding to a phone call.

7. The method of claim 1, wherein the first communication channel and the second communication channel are selected from a plurality of communication channels including one or more of text message, email, phone, physical mail, or chatbot.

8. The method of claim 1, wherein the service is transportation service, the method further comprising:
    selecting the communication from a plurality of communications each requesting information for a different one of: driver license, vehicle insurance, and vehicle inspection.

9. The method of claim 1, further comprising:
    receiving a scanned copy or photo of a driver license of the candidate provider; and
    wherein progressing the candidate provider from the step to the subsequent step of the sequence of steps is further in response to determining that the scanned copy or photo of the driver license is legible and valid.

10. A computer program product comprising a non-transitory computer readable storage medium having instructions encoded thereon that, when executed by one or more processors, cause the one or more processors to:
    determine, based on input data from a client device, that a candidate provider has progressed to a step of a sequence of steps to register for a service of a network system;
    select a first communication channel that the candidate provider is likely to use to respond to a communication;

provide, by the network system to the client device, the communication via the first communication channel for presentation to the candidate provider;

progress the candidate provider from the step to a subsequent step of the sequence of steps in response to determining that the candidate provider completed at least one action indicated by the communication; and provide, by the network system to the client device, a subsequent communication for the subsequent step via a second communication channel for presentation to the candidate provider, the second communication channel different than the first communication channel.

11. The non-transitory computer readable storage medium of claim 10, having further instructions that when executed by the one or more processors cause the one or more processors to:

determine, by a machine learning model, that the candidate provider is likely to use the first communication channel to respond to the communication, the machine learning model trained using historical actions performed by one or more candidate providers and registered providers of the network system.

12. The non-transitory computer readable storage medium of claim 11, wherein machine learning model determines that the candidate provider is likely to use the first communication channel to respond to the communication based on at least one of: the step of the sequence of steps, a type of the service, or the at least one action indicated by the communication.

13. The non-transitory computer readable storage medium of claim 11, wherein machine learning model determines that the candidate provider is likely to use the first communication channel to respond to the communication using information from the one or more candidate providers and registered providers having at least one characteristic in common with the candidate provider, the at least one characteristic based on demographics or geographical region.

14. The non-transitory computer readable storage medium of claim 10, having further instructions that when executed by the one or more processors cause the one or more processors to:

determine that the candidate provider is likely to use the first communication channel to respond to the communication using actions performed in response to a plurality of historical communications by the candidate provider.

15. The non-transitory computer readable storage medium of claim 14, wherein the actions include one or more of: scrolling through content of a message, opening an email, or responding to a phone call.

16. The non-transitory computer readable storage medium of claim 10, wherein the first communication channel and the second communication channel are selected from a plurality of communication channels including one or more of text message, email, phone, physical mail, or chatbot.

17. The non-transitory computer readable storage medium of claim 10, having further instructions that when executed by the one or more processors cause the one or more processors to:

select the communication from a plurality of communications each requesting information for a different one of: driver license, vehicle insurance, and vehicle inspection, wherein the service is transportation service.

18. The non-transitory computer readable storage medium of claim 10, having further instructions that when executed by the one or more processors cause the one or more processors to:

receive a scanned copy or photo of a driver license of the candidate provider; and wherein progressing the candidate provider from the step to the subsequent step of the sequence of steps is further in response to determining that the scanned copy or photo of the driver license is legible and valid.

19. A system comprising:
one or more processors; and
a computer program product comprising a non-transitory computer readable storage medium having instructions encoded thereon that, when executed by the one or more processors, cause the one or more processors to:

determine, based on input data from a client device, that a candidate provider has progressed to a step of a sequence of steps to register for a service of a network system;

select a first communication channel that the candidate provider is likely to use to respond to a communication;

provide, by the network system to the client device, the communication via the first communication channel for presentation to the candidate provider;

progress the candidate provider from the step to a subsequent step of the sequence of steps in response to determining that the candidate provider completed at least one action indicated by the communication; and provide, by the network system to the client device, a subsequent communication for the subsequent step via a second communication channel for presentation to the candidate provider, the second communication channel different than the first communication channel.

20. The system of claim 19, wherein the non-transitory computer readable storage medium includes further instructions that when executed by the one or more processors cause the one or more processors to:

determine, by a machine learning model, that the candidate provider is likely to use the first communication channel to respond to the communication, the machine learning model trained using historical actions performed by one or more candidate providers and registered providers of the network system.

* * * * *